United States Patent [19]

Meckstroth et al.

[11] 4,246,690
[45] Jan. 27, 1981

[54] METHOD OF MAKING A HOSE CLAMP WITH TANGENTIAL SCREW

[76] Inventors: Alan F. Meckstroth, 2357 Shelterwood Dr., Dayton, Ohio 45409; James F. Pease, 5805 Folkestone Dr., Dayton, Ohio 45459

[21] Appl. No.: 9,455

[22] Filed: Feb. 5, 1979

Related U.S. Application Data

[60] Continuation-in-part of Ser. No. 885,675, Mar. 13, 1978, Pat. No. 4,173,816, which is a division of Ser. No. 703,760, Jul. 9, 1976, Pat. No. 4,078,281, Continuation-in-part of Ser. No. 565,545, Apr. 7, 1975, abandoned.

[51] Int. Cl.³ .............................................. B23P 19/00
[52] U.S. Cl. .................................. 29/526 R; 285/236; 285/253; 24/279
[58] Field of Search ............... 29/526 R, 434; 24/275, 24/279, 281; 285/236, 252, 253

[56] References Cited

U.S. PATENT DOCUMENTS

| | | | |
|---|---|---|---|
| 1,397,943 | 11/1921 | Costello | 24/281 X |
| 1,619,841 | 3/1927 | Witwer | 24/281 |
| 2,278,071 | 3/1942 | Gass | 24/281 |
| 2,335,464 | 11/1943 | Tinnerman | 24/281 |
| 2,339,138 | 1/1944 | Black | 24/275 |
| 3,142,881 | 8/1964 | Johnston | 24/279 |
| 3,361,403 | 1/1968 | Oeler | 24/279 X |

FOREIGN PATENT DOCUMENTS

| | | | |
|---|---|---|---|
| 741251 | 11/1955 | United Kingdom | 24/279 |
| 743434 | 1/1956 | United Kingdom | 24/279 |

*Primary Examiner*—Charlie T. Moon
*Attorney, Agent, or Firm*—Jacox & Meckstroth

[57] ABSTRACT

A thin sheet metal strip preferably having a thickness less than 0.015 inch, forms a part-cylindrical portion which integrally connects a folded first ear portion and a second ear portion which is also folded in two embodiments. An integral tongue projects from the first ear portion and may have a pair of parallel longitudinal ribs which project inwardly and interfit with corresponding circumferential ribs formed within said part-cylindrical portion. A sheet metal screw projects through holes within the ear portions, and the second ear portion is adapted to converge toward the first ear portion at a substantial angle relative to the axis of the screw when the screw is tightened for producing a positive non-stripping cocking engagement with the screw. In one embodiment, each of the folded ear portions has a pair of generally triangular side flanges for reinforcing the ear portion, and preferably, the screw engages the tongue to urge it against the hose being clamped. In another embodiment, the second ear portion has a plurality of spaced holes, one of which is selected for receiving the screw threads to cause substantial cocking of the second ear portion relative to the screw.

10 Claims, 8 Drawing Figures

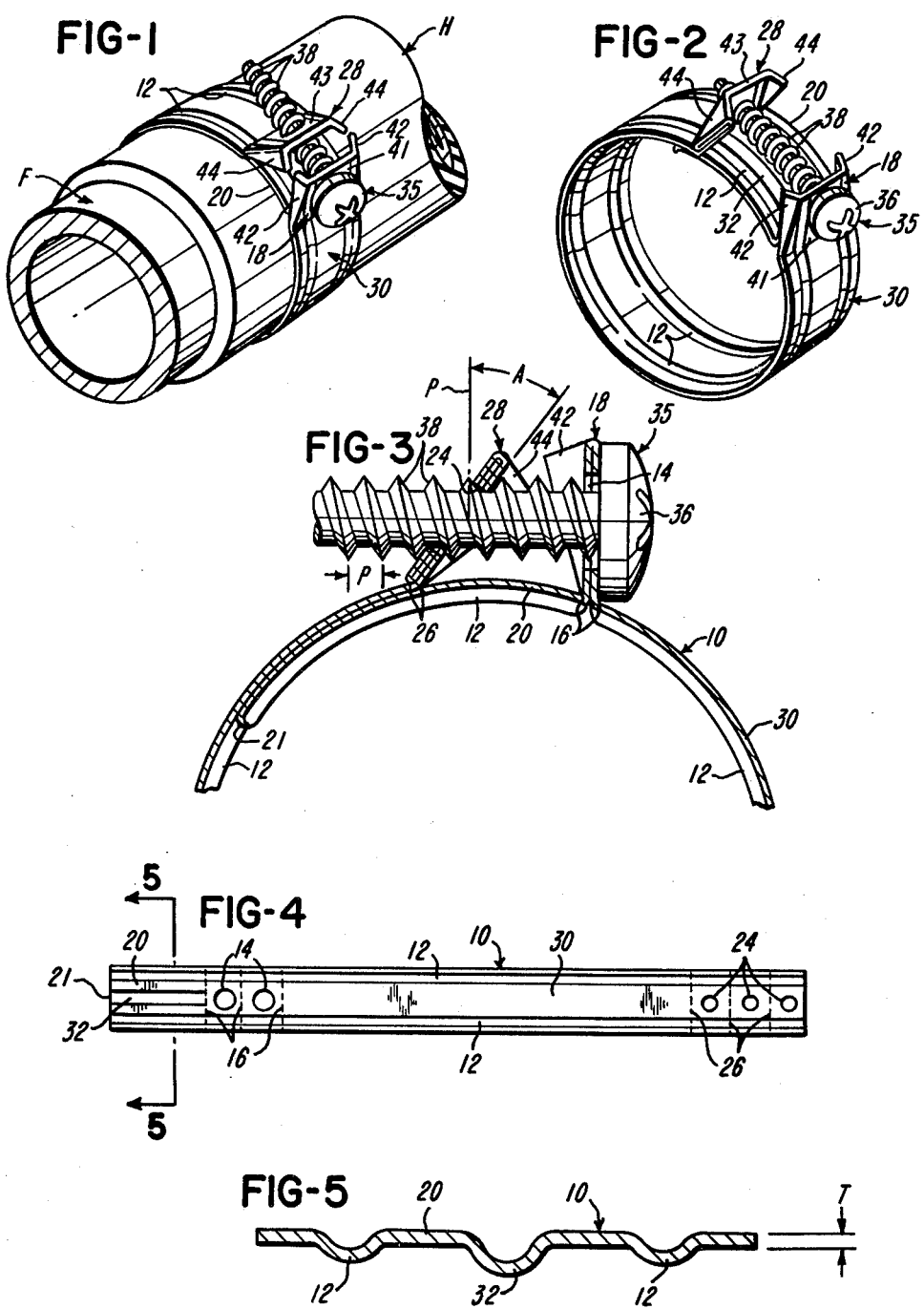

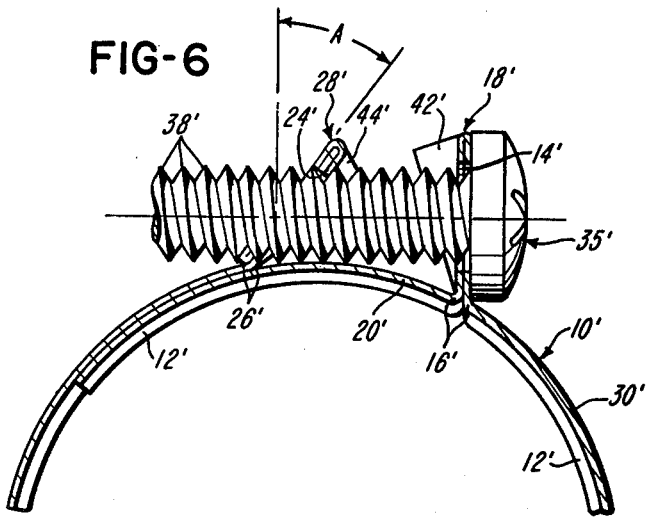
FIG-6
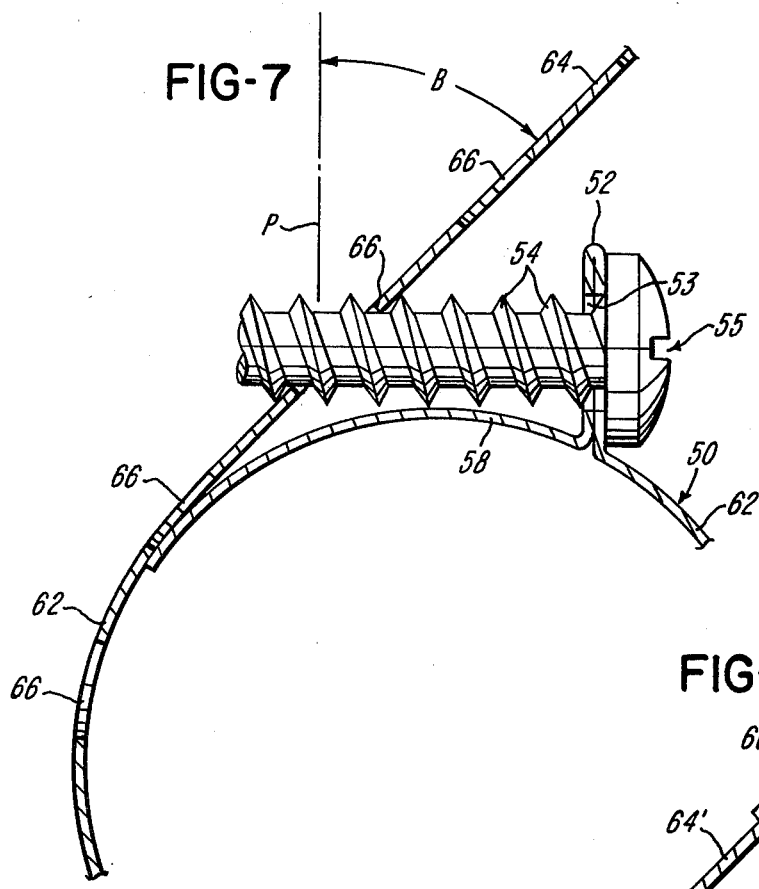
FIG-7
FIG-8

METHOD OF MAKING A HOSE CLAMP WITH TANGENTIAL SCREW

RELATED APPLICATION

This application is a continuation-in-part of U.S. application Ser. No. 885,675 filed Mar. 13, 1978, now U.S. Pat. No. 4,173,816, issued Nov. 13, 1979, which is a division of U.S. patent application Ser. No. 703,760, filed Jul. 9, 1976, now U.S. Pat. No. 4,078,281, issued Mar. 14, 1978, which is a continuation-in-part of U.S. application Ser. No. 565,545, filed Apr. 7, 1975, now abandoned.

BACKGROUND OF THE INVENTION

In the production of adjustable type hose clamps which are commonly used on resilient tubes or hoses in appliances such as clothes washing and dishwashing machines and in connection with engines for motor vehicles, there have been many different forms of hose clamps either proposed or used for securing a hose to a tubular fitting. One of the most common types of hose clamps incorporates a cylindrical metal band which connects a pair of outwardly projecting integral ears having holes for receiving a tangential screw and nut. The adjustable screw provides for accommodating variations in the diameter of the hose and also permits tightening the band to a predetermined compression in addition to permitting the removal and reuse of the hose clamp. Hose clamps may also be made in adjustable interconnecting sections, for example, as disclosed in U.S. Pat. No. 1,340,937.

In one hose clamp which is commonly used, a narrow tongue is punched from the band and is folded back to bridge the gap between the ears so that a clamping force is applied completely around the hose. The band is constructed of a relatively heavy gauge sheet metal, for example, 0.040 inch or greater, in order to avoid bending of the integral ears and to provide the narrow tongue with sufficient strength.

In view of the substantial number of hose clamps which are used, for example, in the appliance industry, there have been many efforts to reduce the cost of producing hose clamps so that they can be sold in volume at a low price. For example, the manufacturing cost has been reduced by eliminating the nut which receives the machine screw. Thus in one clamp design, the sheet metal forming the ear which receives the screw threads is extruded slightly to form the hole in the ear, and the extrusion is threaded to receive the screw.

It is also known to form the ear by double folding the end portion of the metal band and providing a threaded hole within the ear, for example, as disclosed in U.S. Pat. No. 1,187,430. The sheet metal which forms the ear may also be stamped and heat treated to form either a double sheet metal nut such as disclosed in U.S. Pat. No. 3,648,335 or a single sheet metal nut such as disclosed in U.S. Pat. No. 2,335,464 and U.S. Pat. No. 2,359,418. However, in each of these hose clamp designs, the metal which forms the combined ear and nut, must have substantial thickness and/or be of a steel which can be tempered hard to prevent stripping of the screw through the sheet metal nut.

It is apparent from the hose clamps referred to above that the substantial strength which is required in the ears in order to maintain the ears substantially perpendicular to the axis of the tangential screw and to prevent collapsing of the ears and/or stripping of the screws through the ears, has dictated that the clamp be formed from a sheet metal strip having substantial strength and resistance to bending. Thus the sheet metal is selected on a basis of strength required in the ears of the clamp rather than on a basis of the strength required in the part of the clamp which extends around the hose. As a result, the hose clamps are commonly produced from cold rolled carbon sheet metal having substantial thickness which also tends to prevent the clamp from conforming to an out-of-round condition and thus increases the possibility of a leak developing with a non-cylindrical hose.

It is further desirable for a hose clamp to apply a radial clamping force over a substantial area of the hose in a manner whereby the clamping force is not significantly released by either softening or "cold flowing" of the hose material as a result of the clamping pressure being applied over a substantial period of time. U.S. Pat. No. 3,765,066 discloses one form of hose clamp which was designed to maintain a continuous clamping pressure around the hose.

SUMMARY OF THE INVENTION

The present invention is directed to an improved hose clamp of the tangential screw type and which provides for a significant reduction in the cost of producing the clamp. In addition, the hose clamp of the invention provides for accommodating hoses and fittings which are not truly circular or are out-of-round, and also is effective to apply a substantially uniform radial pressure completely around the resilient hose.

In accordance with one embodiment of the invention, a part-cylindrical band is formed from a relatively thin easily bendable sheet metal strip which has a thickness between 0.010 and 0.015 inch. Thus the thickness of the sheet metal strip is less than ⅓ of the thickness of the sheet metal strip which is used in producing the conventional types of hose clamps described above. The strip is folded to form a first ear portion and a second ear portion which are integrally connected by the part-cylindrical band.

The band also has a pair of longitudinally extending and inwardly projecting circumferential ribs which interfit with corresponding ribs formed on a tongue portion projecting integrally from the first ear portion. Both folded ear portions are provided with generally triangular side flanges, and the ear portions have holes for receiving a tangential screw. The hole in the second ear portion receives the threads, and the second ear portion projects at a substantial angle relative to the axis of the screw when the screw is tightened to provide a positive non-stripping engagement of the screw with the second ear portion. In another embodiment, the tangential screw presses against the tongue portion to assure a continuous clamping pressure between the ear portions.

Other features and advantages of the invention will be apparent from the following description, the accompanying drawing and the appended claims.

BRIEF DESCRIPTION OF THE DRAWING

FIG. 1 is a fragmentary perspective view of a resilient hose secured to a cylindrical fitting by a hose clamp constructed in accordance with the invention;

FIG. 2 is a perspective view of the hose clamp shown in FIG. 1 and illustrating the clamp in its released or expanded position;

FIG. 3 is an enlarged fragmentary section of the hose clamp shown in FIG. 1 and also illustrating the clamp in its tightened or gripping position;

FIG. 4 is a plan view of a sheet metal strip which is used to form the hose clamp shown in FIGS. 1-3;

FIG. 5 is a greatly enlarged section of the sheet metal strip taken generally on the line 5—5 of FIG. 4;

FIG. 6 is an enlarged fragmentary section similar to FIG. 3 and showing a modified form of a hose clamp constructed in accordance with the invention;

FIG. 7 is an enlarged fragmentary section similar to FIGS. 3 & 6 and showing another modification of a hose clamp constructed in accordance with the invention; and FIG. 8 is a fragmentary section of a portion defining a screw receiving hole formed in accordance with the invention.

DESCRIPTION OF THE PREFERRED EMBODIMENT

Referring to the drawing, an elongated strip 10 (FIG. 4) of thin cold rolled sheet metal having a thickness T less than 0.020 inch and preferably less than 0.015 inch and on the order of 0.012 inch, is formed with a pair of longitudinally extending parallel ribs 12 which may be either stamped or roll formed within the strip. The strip 10 has a protective coating of a corrosion resisting material such as zinc galvanize coating. One end portion of the strip 10 is punched to form two circular holes 14 and is folded along three parallel spaced lines 16 to form a first ear portion 18 (FIG. 3) having a double wall thickness. The strip also forms an integral tongue portion 20 which projects from the first ear portion 18 and which is provided with a slightly inwardly curved end portion or surface 21 (FIG. 4) and a part-cylindrical curvature (FIG. 3) conforming to a predetermined diameter.

The opposite end portion of the strip 10 is punched with a set of three circular holes 24 and is progressively folded along three parallel lines 26 to form a second ear portion 28 having a triple wall thickness. The ear portions 18 and 28 are integrally connected by an intermediate strip portion 30 which has a part-cylindrical configuration corresponding to the diameter of the tongue portion 20. As shown in FIGS. 3-5, the tongue portion 20 is also provided with an intermediate rib 32 which extends from the first ear portion 18 to the end surface 21 and projects inwardly slightly more than the ribs 12.

A standard sheet metal screw 35 extends through the holes 14 and 24 within the corresponding ear portions 18 and 28, and includes a recessed head portion 36 which abuts the first ear portion 18. The threads 38 of the screw 35 have a coarse pitch P relative to the thickness of the sheet metal strip 10. For example, the screw 35 may consist of a #8-15, type AC screw which has a thread pitch P of approximately 0.067 inch in comparison with the thickness of the strip 10 of 0.012 inch. The outside diameter a #8-15 screw is approximately 0.168 inch, and the inner diameter is approximately 0.122 inch. When the sheet metal screw 35 is a #8-15, the aligned clearance holes 14 within the first ear portion 18 preferably have a diameter of about 0.188 inch, and the aligned holes 24 within the second ear portion 28 preferably have a diameter of about 0.140 inch, or slightly greater than the inner diameter of the screw 35.

As illustrated in FIGS. 1-3, the first ear portion 18 of the hose clamp includes a generally flat trapezoid-shaped base wall 41 connecting a pair of generally triangular side flanges 42. The side flanges 42 project inwardly at an obtuse angle from the base wall 41 and cooperate to reinforce the ear portion 18. Similarly, the second ear portion 28 includes a generally flat trapezoid-shaped base wall 43 connecting a pair of generally triangular side flanges 44 which project inwardly from the base wall 43 at an obtuse angle and cooperate to reinforce the ear portion 28.

When the hose clamp is in its unclamped or expanded position (FIG. 2), the outer end portion of the tongue 20 projects under the second ear portion 28. In this expanded position, the hose clamp is positioned on the end portion of a resilient or rubber tube or hose H which receives a projecting cylindrical coupling or fitting F. When the sheet metal screw 35 is tightened, the ribs 12 within the part-cylindrical intermediate strip portion 30, interfit with the corresponding ribs 12 witin the tongue portion 20 so that the tongue portion is maintained in alignment with the part-cylindrical intermediate strip portion 30.

As the threads of the screw 35 are rotated within the ear portion 28, the ear portion 28 bends along the fold line 26 where it connects with the part-cylindrical intermediate portion 30 and tilts to an inclined position converging towards the first ear portion 18 and forming a substantial acute angle A, for example, between 30° and 50° with a plane P perpendicular to the axis of the screw 35. As the ear portion 28 tilts or cocks on the screw 35 in response to an increasing torque applied to the screw, the engagement of the ear portion 28 with the screw becomes more positive and self-locking so that the screw is prevented from stripping through the hole 24 within the ear portion 28.

FIG. 6 shows a modified hose clamp which is constructed substantially the same as the hose clamp shown in FIGS. 1-3. Accordingly, the common components and structure are identified with the same reference numbers, except with the addition of a prime mark after each reference number in FIG. 6. The primary difference between the hose clamp shown in FIG. 6 and the hose clamp shown in FIGS. 1-3 is that the screw 35' (FIG. 6) is a machine screw instead of a sheet metal screw. For example, the screw 35' illustrated is a #10-24 plated steel screw.

Also, in the hose clamp modification shown in FIG. 6, the hole 24' in the second ear portion 28' has the same diameter as the clearance hole 14' in the first ear portion 18'. However, when the screw 35' is tightened, the substantial tilting or cocking of the ear portion 28' causes the ear portion to grip the screw threads in a manner which prevents stripping of screw 35' through the ear portion 28', even when the screw is tightened with a power driven screw driver. In addition, the location of the holes 14' and 24' within their respective ear portions and the spacing between the ear portions are selected so that the bottom of the screw threads 38' firmly engage and press against the tongue portion 20' when the screw 35' is tightened. This pressing action not only prevents any possible buckling in the tongue portion 20' but also assures that the tongue portion exerts a continuous inwardly directed clamping pressure between the ear portions 18' and 28'. Thus in the modification shown in FIG. 6, the stiffening center rib 32 shown in the hose clamp described in connection with FIGS. 1-5, may be eliminated.

Referring to FIG. 7 which illustrates another embodiment of a hose clamp constructed in accordance with the invention, a thin strip 50 of sheet metal having a uniform width is bent or folded to form an ear portion 52 having a double wall thickness. The ear portion 52 has a clearance hole 53 for receiving the threads 54 of a sheet metal screw 55 in a manner similar to that discussed above in connection with the embodiment shown in FIG. 3. The strip 59 also forms a curved tongue portion 58 which projects from one side of the ear portion 52 and generally conforms in curvature to the part-cylindrical intermediate strip or band portion 62 extending from the other side of the ear portion 52.

The strip 50 extends from the intermediate band portion 62 to form a second ear portion 64 which is also the end portion of the strip 50. A series of longitudinally spaced circular holes 66 are punched or formed within the second ear portion 64, and the diameter of each hole 66 is slightly less than the overall or major diameter of the screw thread 54. The hose clamp embodiment illustrated in FIG. 7 is ideally suited to be formed from a strip 50 of thin stainless steel, for example, a strip having a thickness of about 0.015 inch. The multiple holes 66 in the second ear portion 64 provide for substantial adjustment in the diameter of the hose clamp in order to accommodate a wide range of hose diameters, as commonly required in applications of hose clamps in the "after market".

The principle of operation of the hose clamp shown in FIG. 7 is the same as the hose clamps illustrated in FIGS. 1–6. That is, the threads 54 of the screw 55 are inserted into a selected hole 66 and the hose clamp is placed on a hose and the screw 55 is tightened. The second ear portion 64 cocks so that it projects at a substantial angle B of at least 30 degrees relative to a plane P perpendicular to the axis of the screw and in converging relation with the first ear portion 52. As a result, the second ear portion 64 forms a positive locking engagement with the screw threads 54 and prevents the screw from stripping through the selected hole 66 within the second ear portion. As also illustrated in FIG. 7, the screw threads 54 exert a positive pressure of force inwardly against the tongue portion 58 of the strip 50 in order to avoid any buckling of the tongue portion 58 when the hose clamp is tightened by rotation of the screw 55.

FIG. 8 illustrates a modification of the second ear portion 64 of the hose clamp illustrated in FIG. 7. In this modification, each of the holes 66' is formed by a folded metal annular or eyelet portion 68 which provides a double wall metal thickness. Thus each of the eyelet portions 68 provides a reinforced hole 66' and thereby provides for minimizing the thickness of the sheet metal strip 50 by assuring that the screw threads 54 do not tear through the ear portion 64' when the screw is tightened.

From the drawing and the above description, it is apparent that a hose clamp constructed in accordance with the present invention, provides desirable features and advantages. For example, the thinness of the sheet metal strip 10, 10' or 50 and the use of the standard screw 35, 35' or 55 without a conventional nut, minimizes the material cost of the hose clamp. In addition, the construction of the two part clamp is adapted for automatic production so that it requires a minimum of labor.

Another important feature is provided by the substantial tilting or cocking of the ear portion 28, 28' or 64 with respect to the screw 35, 35' or 55 to assure a positive, non-stripping and self-locking engagement between the ear portion and the screw. In addition, the multiple or three wall thickness of the ear portion 28 or 28' provides for substantial metal engagement between the ear portion and the screw and cooperates to prevent stripping of the screw through the ear portion. Furthermore, the inwardly projecting ribs within the tongue portion and the part-cylindrical intermediate strip portion provide for a concentration of the radial clamping forces along two axially spaced circumferentially extending zones on the resilient hose H. This dual concentration of radial clamping forces completely around the hose, assures a positive seal and minimized "cold flowing" of the resilient or rubber hose material.

As another feature, the thinness of the sheet metal strip 10, 10' or 50 provides flexibility which not only permits the second ear portion to bend, but also permits the hose clamp to conform to substantial out-of-roundness of the exterior surface of the hose. Furthermore, the pair of inwardly projecting ribs 12 within the tongue portion 20 also cooperate with the center rib 32 to provide the tongue portion 20 with sufficient stiffness to avoid outward bending or buckling of the tongue portion when the hose clamp is tightened. In the modifications shown in FIGS. 6 and 7, the screw is also effective to press inwardly on the tongue portion to assure a continuous clamping pressure between the ear portions. In addition, the inwardly projecting end surface 21 prevents the end surface from scraping the inner surface of the strip portion 20 and applying a force which would tend to buckle the tongue portion. As also mentioned above, the inwardly projecting side flanges on the corresponding ear portions cooperate in strengthening the ear portions to avoid bending or collapsing of the base walls of the ear portions when the screw and the hose clamp are tightened.

While the forms of hose clamp herein described constitute preferred embodiments of the invention, it is to be understood that the invention is not limited to these precise forms of clamps, and that changes may be made therein without departing from the scope and spirit of the invention as defined in the appended claims.

The invention having thus been described, the following is claimed:

1. A method of making a hose clamp having a part-cylindrical band portion integrally connecting a first ear portion and a second ear portion, comprising the steps of folding one end portion of an elongated metal strip to form a folded metal first ear portion with an integral tongue portion projecting therefrom, bending the strip to form the part-cylindrical band portion, forming a second end portion of the strip to define a second ear portion adapted to be bent relative to the band portion, forming holes within the first and second ear portions, extending a screw through the holes within the ear portions with the screw threads engaging the second ear portion, and cocking the second ear portion at a substantial angle relative to a reference plane perpendicular to the axis of the screw and in converging relation with the first ear portion for producing a positive non-stripping engagement of the second ear portion with the screw threads.

2. A method as defined in claim 1 and including the step of forming a plurality of longitudinally spaced holes within said second ear portion, and arranging each of the holes to produce the cocking of the second ear portion relative to the reference plane when the screw is tightened.

3. A method as defined in claim 1 wherein the hose clamp is formed from a metal strip having a thickness less than 0.020 inch.

4. A method as defined in claim 1 wherein the second ear portion is cocked to an angle of at least thirty degrees with the reference plane.

5. A method of making a hose clamp having a part-cylindrical band portion integrally connecting a first ear portion and a second ear portion, comprising the steps of bending an elongated metal strip at longitudinally spaced locations to form a first ear portion, a second ear portion and a tongue portion, forming holes within the first and second ear portions, bending the strip to form the part-cylindrical band portion and to position the tongue portion between the ear portions, extending a screw through the holes within the ear portions with the screw threads engaging the second ear portion, and forming the second ear portion to cock at a substantial angle relative to a reference plane perpendicular to the axis of the screw and in converging relation with the first ear portion in response to tightening the screw for producing a positive non-stripping engagement of the second ear portion with the screw threads.

6. A method as defined in claim 5 including the step at forming the second ear portion to produce a generally trapezoid-shaped base wall with a pair of generally triangular-shaped side flanges projecting from the base wall.

7. A method as defined in claim 5 wherein the hose clamp is formed from a metal strip having a thickness of about 0.015 inch.

8. A method as defined in claim 5 including the steps of arranging the holes within the ear portions to position the screw threads in pressure engagement with the tongue portion when the screw is tightened to assure a continuous clamping pressure by the tongue portion between the ear portions.

9. A method as defined in claim 5 including the step of forming a plurality of parallel spaced ribs on the tongue portion of the metal strip.

10. A method as defined in claim 5 wherein the second ear portion is cocked to an angle of at least thirty degrees with the reference plane.

* * * * *

UNITED STATES PATENT AND TRADEMARK OFFICE
CERTIFICATE OF CORRECTION

PATENT NO. : 4,246,690

DATED : January 27, 1981

INVENTOR(S) : Alan F. Meckstroth et al.

It is certified that error appears in the above—identified patent and that said Letters Patent is hereby corrected as shown below:

The term of this patent subsequent to March 14, 1995, has been disclaimed.

Signed and Sealed this

Eighth Day of December 1981

[SEAL]

Attest:

GERALD J. MOSSINGHOFF

Attesting Officer

Commissioner of Patents and Trademarks